United States Patent
Grissa et al.

(10) Patent No.: US 11,343,278 B2
(45) Date of Patent: *May 24, 2022

(54) APPARATUS AND METHOD FOR PROTECTING LOCATION PRIVACY OF COOPERATIVE SPECTRUM SENSING USERS

(71) Applicant: Oregon State University, Corvallis, OR (US)

(72) Inventors: Mohamed Grissa, Corvallis, OR (US); Atilla Yavuz, Corvallis, OR (US); Bechir Hamdaoui, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 167 days.

This patent is subject to a terminal disclaimer.

(21) Appl. No.: 16/784,180

(22) Filed: Feb. 6, 2020

(65) Prior Publication Data
US 2020/0178301 A1    Jun. 4, 2020

Related U.S. Application Data

(63) Continuation of application No. 15/902,965, filed on Feb. 22, 2018, now Pat. No. 10,575,331.

(Continued)

(51) Int. Cl.
| | | |
|---|---|---|
| *H04L 29/06* | (2006.01) | |
| *H04L 9/40* | (2022.01) | |
| *H04W 74/08* | (2009.01) | |
| *H04B 17/318* | (2015.01) | |
| *H04W 12/02* | (2009.01) | |
| *H04W 12/04* | (2021.01) | |
| *H04W 12/03* | (2021.01) | |

(Continued)

(52) U.S. Cl.
CPC ........ *H04L 63/162* (2013.01); *H04B 17/318* (2015.01); *H04W 12/02* (2013.01); *H04W 12/03* (2021.01); *H04W 12/04* (2013.01); *H04W 74/0816* (2013.01); *H04W 16/14* (2013.01); *H04W 74/002* (2013.01); *H04W 88/16* (2013.01)

(58) Field of Classification Search
CPC .............. H04L 63/162; H04W 74/002; H04W 88/16; H04W 16/14; H04W 12/02; H04W 12/04; H04W 74/0816; H04B 17/318
See application file for complete search history.

(56) References Cited

U.S. PATENT DOCUMENTS 8,571,467 B2 * 10/2013 Uusitalo ............. G06F 16/9574
                                                              455/3.06
9,325,677 B2 *  4/2016 Steer ...................... H04L 63/06
(Continued)

OTHER PUBLICATIONS

Notice of Allowance dated Oct. 23, 2019 for U.S. Appl. No. 15/902,965.
(Continued)

*Primary Examiner* — Ajay Cattungal
(74) *Attorney, Agent, or Firm* — Mughal IP P.C.

(57) ABSTRACT

An apparatus is provided which comprises: logic to privately compare one or more received Order Preserving Encrypted (OPE) signal strength (RSS) values, from a plurality of secondary users (SUs), with a OPE threshold value; a transmitter to send the comparison result to a fusion center (FC); and a receiver to receive the OPE threshold value from the FC.

20 Claims, 7 Drawing Sheets

Related U.S. Application Data

(60) Provisional application No. 62/464,796, filed on Feb. 28, 2017.

(51) Int. Cl.
  *H04W 16/14* (2009.01)
  *H04W 88/16* (2009.01)
  *H04W 74/00* (2009.01)

(56) References Cited

U.S. PATENT DOCUMENTS

| | | | | |
|---|---|---|---|---|
| 2008/0133935 A1* | 6/2008 | Elovici | ............... | H04L 63/08 |
| | | | | 713/193 |
| 2010/0144338 A1* | 6/2010 | Kim | ............... | H04W 52/244 |
| | | | | 455/422.1 |
| 2011/0138183 A1* | 6/2011 | Reddy | ............... | H04L 9/0891 |
| | | | | 713/169 |
| 2012/0172002 A1 | 7/2012 | Hahn et al. | | |
| 2012/0300694 A1* | 11/2012 | Watanabe | ............... | H04B 7/14 |
| | | | | 370/315 |
| 2012/0311657 A1* | 12/2012 | Boldyrev | ............... | H04L 63/20 |
| | | | | 726/1 |
| 2013/0196632 A1* | 8/2013 | Horn | ............... | H04W 72/0433 |
| | | | | 455/411 |
| 2013/0336155 A1* | 12/2013 | Jantti | ............... | H04W 24/08 |
| | | | | 370/252 |
| 2016/0219475 A1* | 7/2016 | Kim | ............... | H04W 28/08 |
| 2018/0020366 A1* | 1/2018 | Martin | ............... | H04B 17/318 |
| 2018/0041906 A1* | 2/2018 | Jang | ............... | H04W 24/10 |
| 2019/0069312 A1* | 2/2019 | Oh | ............... | H04L 5/0092 |

OTHER PUBLICATIONS

Non-Final Office Action dated Apr. 17, 2019 for U.S. Appl. No. 15/902,965.

Zina, "Location Privacy Preservation in Secure Crowd Sourcing-Based Cooperative Spectrum Sensing", EURASIP Journal on Wireless Communications and Networking (2016) 2016:85 DOI 10.1186/s13638-016-0567-7 (11 pages).

* cited by examiner

APPARATUS AND METHOD FOR PROTECTING LOCATION PRIVACY OF COOPERATIVE SPECTRUM SENSING USERS

CLAIM FOR PRIORITY

This application is a Continuation of, and claims priority to, U.S. patent application Ser. No. 15/902,965, filed Feb. 22, 2018, and titled, "APPARATUS AND METHOD FOR PROTECTING LOCATION PRIVACY OF COOPERATIVE SPECTRUM SENSING USERS", now issued as U.S. Pat. No. 10,575,331, on Feb. 25, 2020, which claims the benefit of priority to U.S. Provisional Patent Application No. 62/464,796, filed on Feb. 28, 2017, titled "APPARATUS AND METHOD FOR PROTECTING LOCATION PRIVACY OF COOPERATIVE SPECTRUM SENSING USERS," and which is incorporated by reference in entirety.

GOVERNMENT SUPPORT STATEMENT

The embodiments of the invention were made with the support of the United States Government under Award No. CNS-1162296 awarded by the National Science Foundation. The Government has certain rights in the invention.

BACKGROUND

Cooperative spectrum sensing is a component of cognitive radio networks (CRNs) for enabling dynamic and opportunistic spectrum access. It consists of having secondary users (SUs) sense the licensed channels on a regular basis and collaboratively decide whether a channel is available prior to using it so as to avoid harming primary users (PUs). However, cooperative spectrum sensing suffers from serious security and privacy threats.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
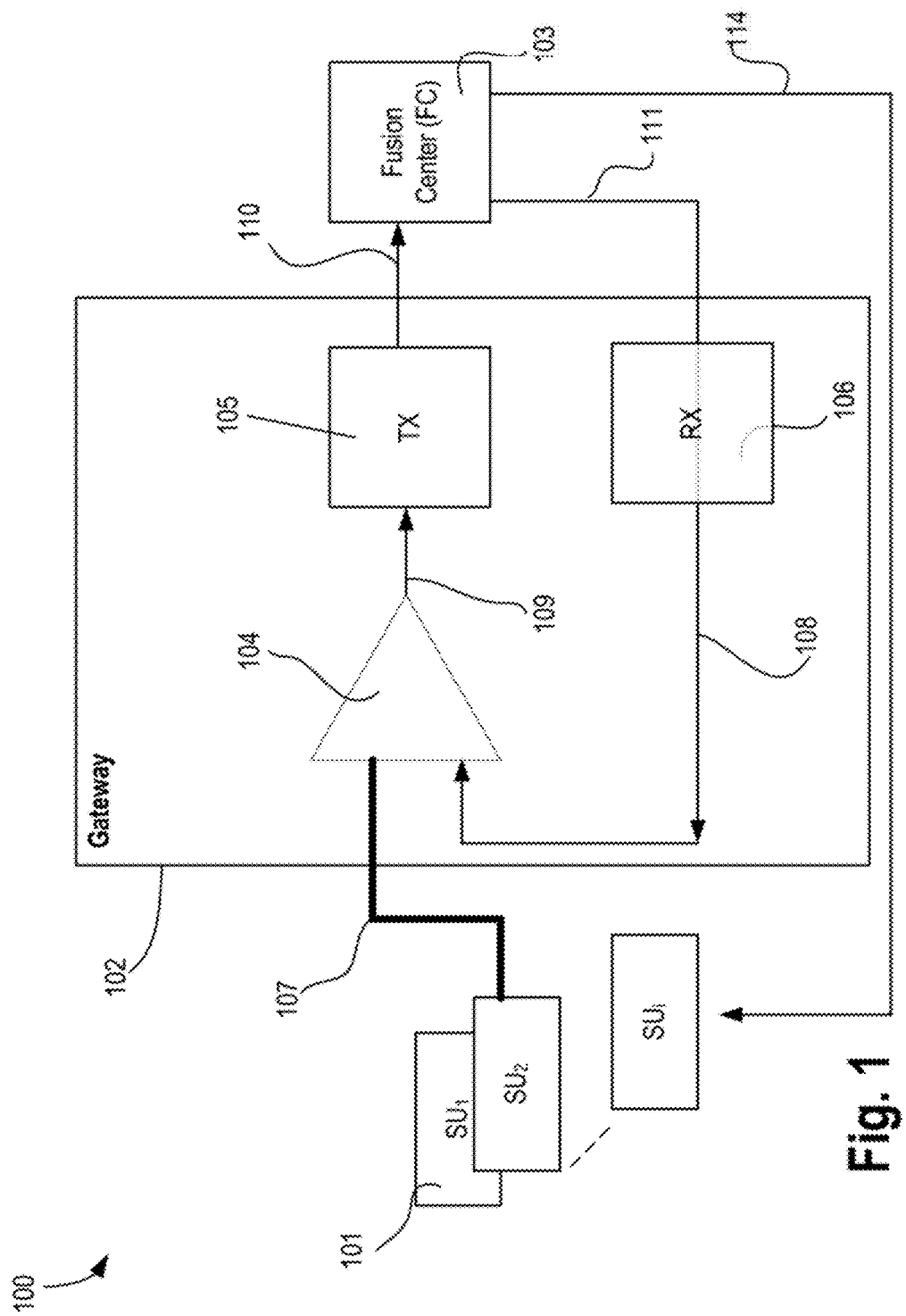
FIG. 1 illustrates an apparatus/system for protecting location privacy of cooperative spectrum sensing users, in accordance with some embodiments.

One popular spectrum sensing technique is energy detection, due to its simplicity and ease of implementation. In a spectrum sensing technique, the presence of PU signal is detected by measuring and relying on energy strength of a sensed signal, commonly known as the received signal strength (RSS). Broadly speaking, cooperative spectrum sensing techniques can be classified into two categories: Centralized and distributed.

In centralized techniques, a central entity called fusion center (FC) orchestrates the sensing operations. The FC selects one channel for sensing and, through a control channel, requests that each SU perform local sensing on that channel and send its sensing report (e.g., the observed RSS value) back to it. It then combines the received sensing reports, makes a decision about the channel availability, and diffuses the decision back to the SUs. In distributed sensing techniques, SUs may not rely on an FC for making channel availability decisions. They instead exchange sensing information among one another to come to a unified decision. This requirement makes distributed sensing techniques highly complex with respect to their centralized counterparts. Hence, centralized sensing techniques are considered more practical for real-life applications.

Despite its usefulness and effectiveness in promoting dynamic spectrum access, cooperative spectrum sensing suffers from security and privacy threats. One threat to SUs, which is tackled by the various embodiments, is location privacy, which can easily be leaked due to the wireless nature of the signals communicated by SUs during the cooperative sensing process. In fact, it has been shown that RSS values of SUs are highly correlated to their physical locations, thus making it easy to compromise the location privacy of SUs when sending out their sensing reports. The fine-grained location, when combined with other publicly available information, could easily be exploited to infer private information about users.

Examples of such private information are shopping patterns, user preferences, and user beliefs, just to name a few. With such privacy threats and concerns, SUs may refuse to participate in the cooperative sensing tasks. It is therefore imperative that cooperative sensing schemes be enabled with privacy preserving capabilities that protect the location privacy of SUs, thereby encouraging them to participate in such a key CRN function, the spectrum sensing.

Security and privacy in CRNs, such as security issues in fully distributed cooperative sensing (a privacy-preserving protocol for CRN transactions using a commitment scheme and zero-knowledge proof), have gained some attention recently. Location privacy, though well studied in the context of location-based services, has received little attention in the context of CRNs. Some works focused on location privacy but not in the context of cooperative spectrum sensing (e.g., database-driven spectrum sensing and dynamic spectrum auction).

In the context of cooperative spectrum sensing, SUs' locations can be inferred from their RSS reports (e.g., the SRLP (single report location privacy) attack). The DLP (differential location privacy) attack are also identified, where a malicious entity can estimate the RSS (and hence the location) of a leaving/joining user from the variations in the final aggregated RSS measurements before and after user's joining/leaving of the network. As such PPSS, a protocol for cooperative spectrum sensing, was proposed to address these two attacks.

Despite its merits, PPSS has several limitations: (i) It needs to collect all the sensing reports to decode the aggregated result. This is not fault tolerant, since some reports may be missing due, for example, to the unreliable nature of wireless channels; (ii) It cannot handle dynamism if multiple users join or leave the network simultaneously; (iii) The pairwise secret sharing requirement incurs extra communication overhead and delay; and (iv) The underlying encryption scheme requires solving the Discrete Logarithm Problem, which is possible only for very small plaintext space and can be extremely costly (see, for example, Table 1).

PDAFT is another fault-tolerant and privacy-preserving data aggregation scheme for smart grid communications. PDAFT may be suitable for cooperative sensing schemes, but in the narrow context of smart grids. But unlike PPSS, PDAFT relies on an additional semi-trusted entity, called gateway, and like other aggregation based methods, is prone to the DLP attack.

Some embodiments describe an efficient scheme, which is also referred to as LPOS, to overcome the limitations that existent approaches suffer from. LPOS combines order preserving encryption and Yao's millionaire protocol to provide a high location privacy while enabling an efficient sensing performance, in accordance with some embodiments.

Some embodiments describe an efficient privacy-preserving scheme (method, apparatus, and system) for cooperative spectrum sensing that exploits various cryptographic mechanisms to preserve the location privacy of SUs while performing the cooperative sensing task reliably and efficiently. The embodiments of various embodiments are secure and more efficient than its existing counterparts, and is robust against sporadic topological changes and network dynamism (e.g., when multiple users leave or join the communication network simultaneously).

Various embodiments provide an apparatus/system and method that prevent the risk of external attackers by relying on encrypting the exchanged messages between the FC and the SUs. The location privacy threat may come from sensing reports that the users (e.g., SUs) share with the FC as these reports are highly correlated to the physical location of the users. Some embodiments protect these sensing reports or information from external attackers and also from a base station and/or service provider (e.g., internet service provider). Some embodiments protect from malicious users through the use of a reputation mechanism to gradually eliminate or reduce substantially the malicious users from the communication system. Some embodiments of the disclosure are fault tolerant and robust against network dynamism. The apparatus and method of some embodiments provide reliability and resiliency against malicious users. Other technical effects will be evident from the various figures and embodiments.

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described, but are not limited to such.

FIG. 1 illustrates apparatus or system 100 for protecting location privacy of cooperative spectrum sensing users, in accordance with some embodiments. In some embodiments, system 100 comprises secondary users 101 (e.g., $SU_{1-i}$, where 'i' is an integer greater than 2); gateway (GW) 102, and fusion center (FC) 103. In some embodiments, GW 102 comprises comparator 104, transmitter 105, and receiver 106. The scheme using system 100 applies a new location privacy-preserving scheme, also referred to as LP-3PSS (location privacy for 3-party spectrum sensing architecture), which harnesses various cryptographic primitives (e.g., order preserving encryption) in innovative ways along with an additional architectural entity (e.g., a gateway) to achieve high location privacy with a low overhead. In some embodiments, an SU may be a mobile device (e.g., a laptop, a smart phone, a wearable device, etc.). In some embodiments, a FC may be a computing device such as a server, a mobile phone, a machine in a cloud, etc. In some embodiments, the FC is part of a base station compatiable with any known communication technology such as LTE, 4G, 5G, etc. In some embodiments, a gateway can be a network switch with a processor, a computing device, a router with a processor, an application specific integrated circuit (ASIC), etc.

The LP-3PSS scheme of various embodiments offers several desirable properties. For example, properties like: location privacy of secondary users while performing the cooperative spectrum sensing effectively and reliably; fault tolerance and robustness against network dynamism (e.g., multiple SUs join/leave the network) and failures (e.g., missed sensing reports); reliability and resiliency against malicious users via an efficient reputation mechanism; and accurate spectrum availability decisions via half-voting rule while incurring minimum communication and computation overhead.

Note that for simplicity and so as not to obscure the embodiments, energy detection through RSS measurement for spectrum sensing is described for the various embodiments. However, the scheme of various embodiments can be applied with any other spectrum detection technique whose sensing reports may leak information about the location of the users.

Various embodiments describe a cooperative spectrum sensing architecture that comprises FC 103 and a set of SUs 101, where each SU 101 is assumed to be capable of measuring or detecting spectrum sensing (e.g., by RSS measurement) on any channel by means of an energy detection method. In the cooperative sensing architecture of various embodiments, FC 103 combines the sensing observations collected from the SUs 101, decides about the spectrum availability, and broadcasts the decision back to the SUs 101 through a control channel. In some embodiments, this can be done via either hard or soft decision rules.

One soft decision rule is aggregation, where FC 103 collects the RSS values (e.g., via wired means 107 or by wireless means 107) from the SUs 101 and compares their average (e.g., by using comparator or other logic 104) to a predefined threshold 108, τ, to decide on the channel availability. For example, FC 103 can collect the RSS values from the SUs 101, make a vote for each SU separately, and then combine all votes to decide about the availability of the channel.

In hard decision rules, such as voting, FC 103 combines votes instead of RSS values. Here, each SU 101 compares its RSS value with threshold 108 τ, makes a local decision (e.g., available or not), and then sends to FC 103 its local decision/vote (e.g., one-bit decision) instead of sending its RSS value. In some embodiments, FC 103 then applies a voting rule on the collected votes to make a channel availability decision. However, for security reasons, it may not be desirable to share threshold 108 τ with SUs 101.

In some embodiments, voting-based decision rule is used, where threshold 108 τ is not to be shared with the SUs 101. There are at least two reasons for choosing voting-based decision rule over the aggregation-based decision rule: (i) Aggregation methods are more prone to sensing errors; for example, receiving some erroneous measurements that are far off from the average of the RSS values can skew the computed RSS average, thus leading to wrong decision; and (ii) Voting does not expose users to the DLP attack. However, the embodiments can use aggregation-based decision rule(s) instead or in conjunction with voting-based decision rule(s).

In some embodiments, threshold 108 τ is not shared with the SUs 101 because doing so may limit the action scope of malicious users that may want to report falsified RSS values for malicious and/or selfish purposes. In some embodiments, a 3-party cooperative sensing architecture is used, where a third entity, called gateway (GW) 102, is incorporated along with FC 103 and SUs 101 to cooperate with them in performing the sensing task. In some embodiments, the additional gateway 102 allows to achieve higher privacy and lesser computational overhead.

In some embodiments, a semi-honest threat model is used, where all the network parties (e.g., SUs 101, GW 102, and FC 103) are assumed to be honest but curious in that they execute the protocol honestly but show interest in learning information about the other parties. This means that none of these entities is trusted. The following assumptions are made for some embodiments:

Security Assumption 1: No party in the system modifies maliciously (or nonmaliciously) the integrity of its input. For example, (i) FC 103 does not maliciously inject false threshold 108 τ; and (ii) the SUs 101 do not maliciously change their RSS values 107.

Security Assumption 2: No party in the system 100 colludes with any of the other parties. For example, (i) FC 103 does not collude with SUs 101; (ii) SUs 101 do not collude with one another; and (iii) GW 102 does not collude with SUs 101 or FC 103.

As mentioned before, RSS values 107 are shown to be highly correlated to the SUs' locations. Therefore, if the confidentiality of the RSS values is not protected, then nor is the location privacy of the SUs 101. With this in mind, there are two security objectives, according to some embodiments.

The first security objective is to keep the RSS value of each SU confidential to the SU only by hiding it from all other parties. This should hold during all sensing periods and for any network membership change. Also, since SUs may rely on the threshold 108 τ to maliciously manipulate their RSSs, the second objective is then to keep threshold 108 τ confidential to the FC 103 merely by hiding it from all other parties. This should hold during all sensing periods and for any network membership change.

The scheme of some embodiments uses the half-voting decision rule. Let $h_o$ and $h_1$ be the spectrum sensing hypothesis that PU is absent and present, respectively. Let $P_f$, $P_d$ and $P_m$ denote the probabilities of false alarm, detection, and missed detection, respectively, of one SU; e.g., $P_f$=Pr(RSS>τ|$h_o$), $P_d$=Pr(RSS>τ|$h_1$), and $P_m$=1−$P_d$.

In some embodiments, FC 103 collects the 1-bit decision $D_i$ from each SU $U_i$ and fuses them together according to the following fusion rule:

$$dec = \begin{cases} H_1, & \sum_{i=1}^{n} D_i \geq \lambda \\ H_o, & \sum_{i=1}^{n} D_i < \lambda \end{cases} \quad \text{Equation (1)}$$

In some embodiments, FC 103 infers that PU is present when at least $\lambda$ SUs 101 are inferring $h_1$. Otherwise, FC 103 may decide that PU is absent, e.g., $H_o$. Note here that the OR fusion rule corresponds to the case where $\lambda=1$ and the AND fusion rule corresponds to the case where $\lambda=n$. The cooperative spectrum sensing false alarm probability, $Q_f$, and missed detection probability, $Q_m$, are: $Q_f = \Pr(H_1|h_0)$ and $Q_m = \Pr(H_o|h_1)$. Letting n be the number of SUs 101, the optimal value of $\lambda$ that minimizes $Q_f + Q_m$ is $\lambda_{opt} = \min(n, \lceil n/(1+\alpha) \rceil)$, where $$\alpha = \ln\left(\frac{P_f}{1-P_m}\right) / \ln\left(\frac{P_m}{1-P_f}\right)$$

and $\lceil \cdot \rceil$ denotes the ceiling function. For simplicity, $\lambda_{opt}$ is denoted as $\lambda$ throughout this disclosure.

To make the voting rule more reliable, some embodiments incorporate a reputation mechanism that allows FC 103 to progressively eliminate faulty and malicious SUs 101. It does so by updating and maintaining a reputation score for each SU 101 to reflect the level of reliability the SU has. Some embodiments incorporate the Beta Reputation mechanism, which is robust.

At the end of each sensing period t, FC 103 obtains a decision vector, $b(t)=[b_1(t), b_2(t), \ldots, b(t)]^T$ with $b_i(t) \in \{0, 1\}$, where $b_i(t)=0$ (resp. $b_i(t)=1$) means that the spectrum is reported to be free (resp. busy) by SU $U_i$. FC then makes a global decision using the fusion rule f as follows:

$$dec(t) = f(w(t), b(t)) = \begin{cases} 1 & \text{if } \sum_{i=1}^{n} w_i(t)b_i(t) \geq \lambda \\ 0 & \text{otherwise} \end{cases} \quad \text{Equation (2)}$$

where $w(t)=[w_1(t), w_2(t) \ldots, w_n(t)]^T$ is the weight vector calculated by FC 103 based on the credibility score of each user, as will be shown shortly, and $\lambda$ is the voting threshold determined by a Half-voting rule.

For each SU 101 $U_i$, FC 103 maintains positive and negative rating coefficients, $\rho_i(t)$ and $\eta_i(t)$, that are updated every sensing period t as:

$\rho_i(t)=\rho_i(t-1)+v_1(t)$ and $\eta_i(t)=\eta_i(t-1)+v_2(t)$, where $v_1(t)$ and $v_2(t)$ are calculated as:

$$v_1(t) = \begin{cases} 1 & b_i(t) = dec(t) \\ 0 & \text{otherwise} \end{cases}$$

$$v_2(t) = \begin{cases} 1 & b_i(t) \neq dec(t) \\ 0 & \text{otherwise} \end{cases}$$

Here, $\rho_i(t)$ (resp. $\eta_i(t)$) reflects the number of times $U_i$'s observation, $b_i(t)$, agrees (resp. disagrees) with the FC's global decision, dec(t). FC 103 computes then $U_i$'s credibility score, $\varphi_i(t)$, and contribution weight, $w_i(t)$, at sensing period t as:

$$\varphi_i(t) = \frac{\rho_i(t)+1}{\rho_i(t)+\eta_i(t)+2} \quad \text{Equation (3)}$$

$$w_i(t) = \varphi_i(t) / \sum_{j=1}^{n} \varphi_j(t) \quad \text{Equation (4)}$$

Various embodiments use cryptographic building block(s)—Order Preserving Encryption (OPE). Order Preserving Encryption (OPE) is a deterministic symmetric encryption scheme whose encryption preserves the numerical ordering of the plaintexts, e.g., for any two messages $m_1$ and $m_2$, s.t. $m_1 \leq m_2$, $c_1 \leftarrow \text{OPE}.\varepsilon_K(m_1) \leq c_2 \leftarrow \text{OPE}.\varepsilon_K(m_2)$, with $c \leftarrow \text{OPE}.\varepsilon_K(m)$ is order preserving encryption of a message $m \in \{0,1\}^d$ under key K, where d is the block size of OPE.

Note that communications are made over a secure (e.g., authenticated) channel maintained with a symmetric key (e.g., via SSL/TLS as in Algorithm 1) to ensure confidentiality and authentication. For the sake of brevity, encryptions are written but not the authentication tags (e.g., Message Authentication Codes).

The scheme of some embodiments, which is also called LP-3PSS (location privacy for 3-party spectrum sensing architecture), offers high location privacy and low overhead, and uses an additional entity in the network, referred to as Gateway (GW) (thus "3P" refers to the 3 parties: SUs 101, GW 102, and FC 103).

In some embodiments, GW 102 enables a higher privacy by preventing FC 103 from even learning the order of encrypted RSS values 107 of SUs 101 which was allowed in LPOS. In some embodiments, GW 102 also learns nothing but secure comparison outcome of RSS values and threshold 108 $\tau$, but merely using OPE. Thus, in some embodiments, no entity learns any information on RSS 107 or threshold 108 $\tau$ beyond a pairwise secure comparison, which is the minimum information required for a voting-based decision.

In some embodiments, GW 102 is enabled to privately compare (as indicated by block 203) n distinct OPE encryptions of threshold 108 $\tau$ (from block 202) and RSS values 107 (from block 201). The RSS values 107 are encrypted under n pairwise keys established between FC 103 and SUs 101, in accordance with some embodiments. These OPE encrypted pairs from block 201 and 202 permit GW 102 to learn the comparison outcomes 109 without deducing any other information.

In some embodiments, GW 102 performs the comparisons between OPE encrypted threshold 108 $\tau$ (e.g., from FC 103 as signal 111) and OPE encrypted RSS values 107. In some embodiments, there are merely two rounds of communication between GW 102 and FC 103. GW 102 then sends the outcome 110 to FC 103. There may be no additional round of communication between GW 102 and FC 103 after outcome 110 is transmitted to FC 103. In some embodiments, FC 103 provides a final decision 114 to SUs 101 about spectrum availability after combining the comparison output coming from GA 102 using half voting rule.

In some embodiments, GW 102 then sends these comparison results 110 to FC 103 to make the final decision as indicated by block 204. In some embodiments, FC 103 learns no information on the RSS values 107, and SUs 101 cannot obtain the value of threshold 108 $\tau$, which complies with the first and second security objectives of the various embodiments. Note that LP-3PSS, in some embodiments, relies merely on symmetric cryptography to guarantee the location privacy of SUs. Hence, in some embodiments, LP-3PSS is the most computationally efficient and compact scheme among all alternatives, but with an additional entity in the system.

Figure 2:
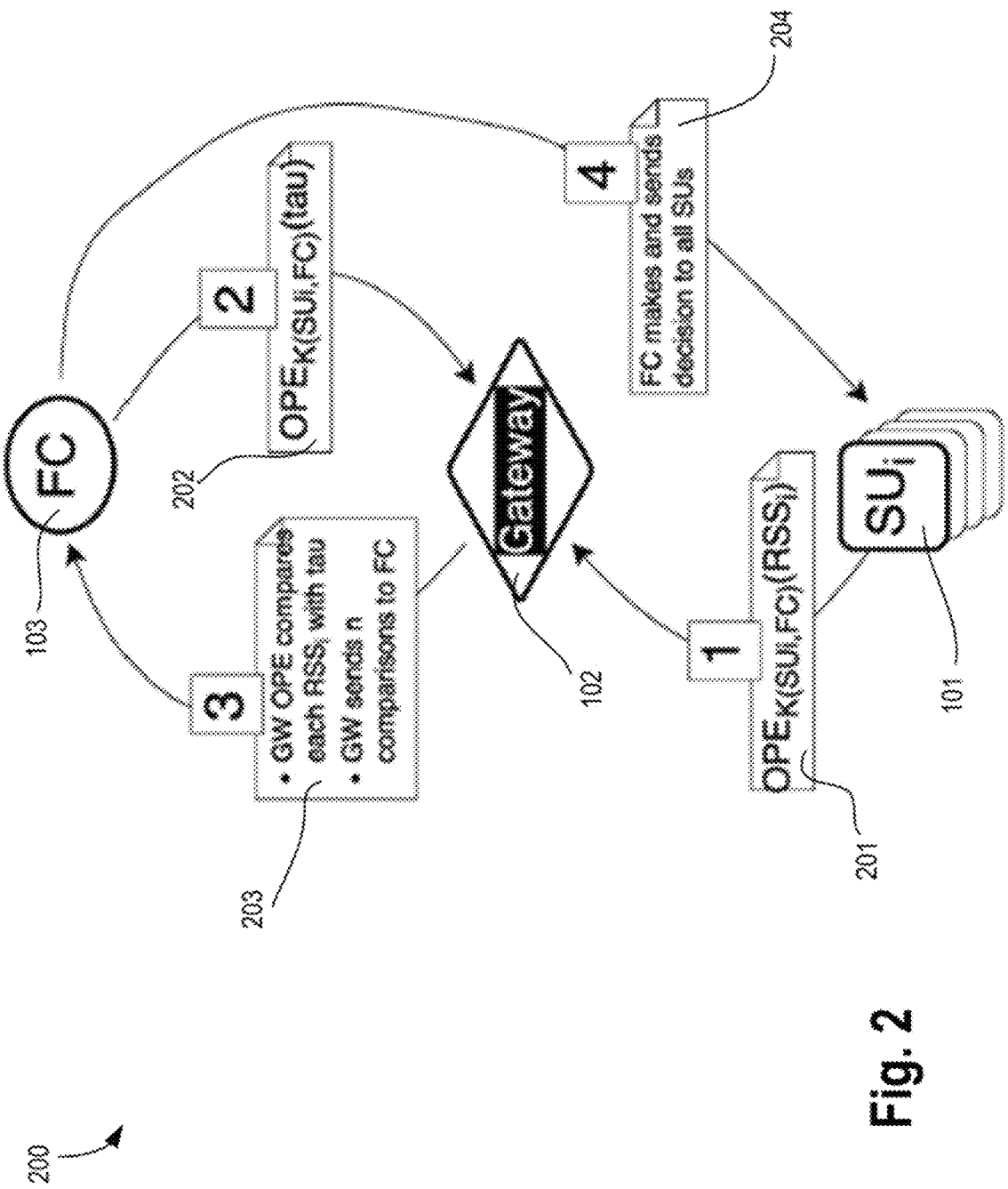
FIG. 2 illustrates a high level flowchart of a scheme for protecting location privacy of cooperative spectrum sensing users, in accordance with some embodiments.
Figure 4:
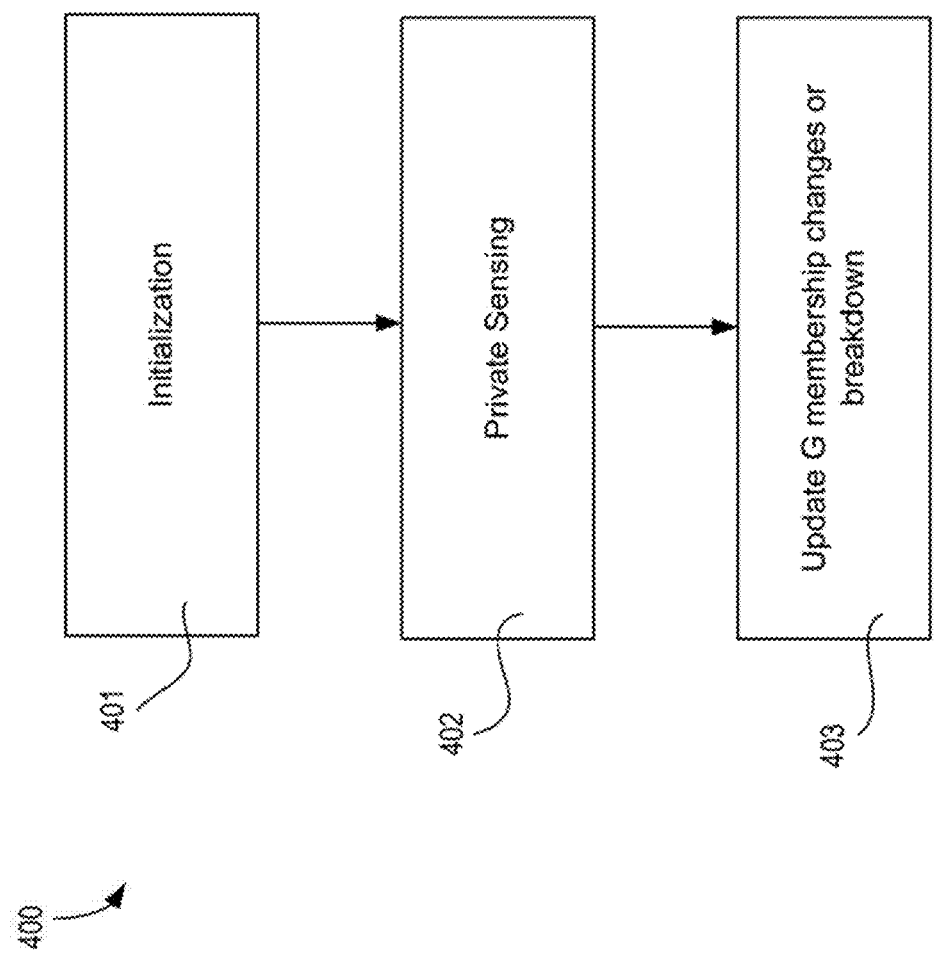
FIG. 4 illustrates a method for protecting location privacy of cooperative spectrum sensing users, in accordance with some embodiments.

FIG. 2 illustrates a high level flowchart 200 of a scheme for protecting location privacy of cooperative spectrum sensing users, in accordance with some embodiments. FIG. 4 illustrates a method 400 for protecting location privacy of cooperative spectrum sensing users, in accordance with some embodiments. The method of FIG. 4 is a high level method of FIG. 2 and are discussed together. In some embodiments, the scheme for protecting location privacy of cooperative spectrum sensing users begins with an initialization process 401 that may be executed merely once. The initialization process is then followed by a private sensing process 402. In some embodiments, the private sensing process 402 is executed every sensing period $t_w$. In some embodiments, the voting threshold $\lambda$ is updated after the private sensing process 402. For example, at block 403, the voting threshold $\lambda$ is updated after G membership changes or breakdown.

In some embodiments, during the initialization process 401, FC 103 sets energy sensing, optimal voting thresholds $\tau$, $\lambda$, and weights vector $w \leftarrow 1$, respectively. In some embodiments, the entities establish private pairwise keys and maintain authenticated secure channels (e.g., via SSL/TLS) as follows:

a. $k_{FC,i}$ between FC 103 and each user 101 $U_i$, i=1, ..., n.

b. $k_{GW,i}$ between GW 102 and each user 101 $U_i$, i=1, ..., n.

c. $k_{FC,GW}$ between GW 102 and FC 103.

In some embodiments, FC 103 computes $c_i \leftarrow \varepsilon_{k_{FC,GW}}(OPE.\varepsilon_{k_{FC,i}}(\tau))$, i=1, ..., n and sends $\{c_i\}_{i=1}^n$ to GW 102 as illustrated by block 202. Let $(\varepsilon, D)$ be IND-CPA secure block cipher (e.g. AES) encryption/decryption operations. In some embodiments, FC 103 establishes a secret key with each SU 101 and GW 102. In some embodiments, GW 102 establishes a secret key with each SU 101. In some embodiments, FC 102 encrypts threshold 108 $\tau$ with OPE using $k_{FC,i}$, i=1 ... n. In some embodiments, FC 102 then encrypts OPE ciphertexts with c using $k_{FC,GW}$ and sends these $c_i$s to GW 102, i=1 ... n. Since these encryptions are done offline at the beginning of the protocol, they may not impact the online private sensing phase, in accordance with some embodiments. FC 102 may also pre-compute a few extra encrypted values in the case of new users joining the sensing, in accordance with some embodiments.

In some embodiments, the private sensing process 402 comprises the following process:

1. $U_i$ computes $\varsigma_i \leftarrow \varepsilon_{k_{GW,i}}(OPE.\varepsilon_{k_{FC,i}}(RSS_i))$, i = 1, ..., n and sends $\{\varsigma_i\}_{i=1}^n$ to GW 102.
2. GW 102 obtains $OPE.\varepsilon_{k_{FC,i}}(\tau) \leftarrow D_{k_{FC,GW}}(c_i)$ and $OPE.\varepsilon_{k_{FC,i}}(RSS_i) \leftarrow D_{k_{GW,i}}(\varsigma_i)$, i = 1, ..., n.
3. for i = 1, ..., n do
4. if $OPE.\varepsilon_{k_{FC,i}}(RSS_i) < OPE.\varepsilon_{k_{FC,i}}(\tau)$ then $b_i \leftarrow 0$
5. Else $b_i \leftarrow 1$
6. GW 102 computes $\varsigma \leftarrow \varepsilon_{k_{FC,GW}}(\{b_i\}_{i=1}^n)$ and send $\varsigma$ to FC.

7. 
$$FC\ 103\ decrypts\ \varsigma\ and\ computes\ \upsilon \leftarrow \sum_{i=1}^{n} w_i \times b_i$$

8. If $v \geq \lambda$ then dec $\leftarrow$ Channel busy
9. else dec $\leftarrow$ Challen free
10. FC 103 updates the credibility score $\varphi_i$ and weight $w_i$ of each user $U_i$ as in equations 3 and 4 for i = 1, ..., n return$^{dec}$ In some embodiments, as during private sensing process 402, each $U_i$ (e.g., 101) encrypts $RSS_i$ with OPE using $k_{FC,i}$, which was used by FC 103 to OPE encrypt $\tau$ value. In some embodiments, $U_i$ then encrypts this ciphertext with $\varepsilon$ using key $k_{GW,i}$, and sends the final ciphertext $\varsigma_i$ to GW 102. In some embodiments, GW 102 decrypts 2n ciphertexts $c_i$s and $\varsigma_i$s with D using $k_{FC,GW}$ and $k_{GW,i}$, which yields OPE encrypted values. In some embodiments, GW 102 then compares each OPE encryption of RSS with its corresponding OPE encryption of threshold 108 $\tau$. Since both were encrypted with the same key, GW 102 can compare them and conclude which one is greater as in step 4. In some embodiments, GW 102 stores the outcome of each comparison in a binary vector b, encrypts and sends it to FC 103. In some embodiments, FC 103 then compares the summation of votes v to the optimal voting threshold $\lambda$ to make the final decision about spectrum availability and updates the reputation scores of the users.

In some embodiments, process 403 comprises the following steps. If a user joins the network, it needs to establish a pairwise secret key with FC 103 and GW 102. If SU(s) 101 join/leave or breakdown, $\lambda$ is updated as $\lambda'$. In some embodiments, during process 403, each new user joining the sensing just establishes a pairwise secret key with FC 103 and GW 102. This may have no impact on existing users. If some users leave the network, FC 103 and GW 102 remove their secret keys, which also has no impact on existing users, in accordance with some embodiments. In some embodiments, in both cases, and also in the case of a breakdown or failure, $\lambda$ is updated accordingly.

Figure 3:
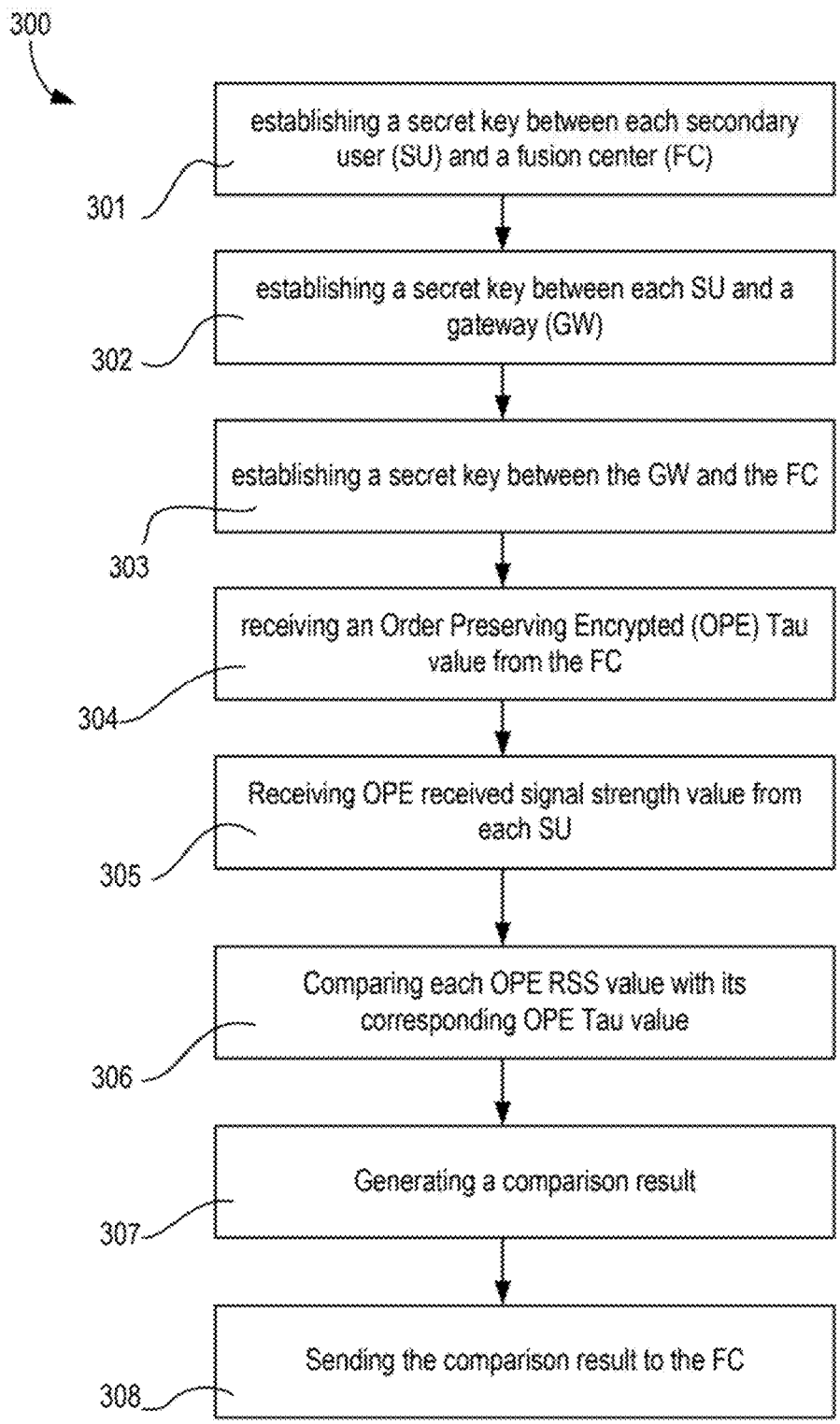
FIG. 3 illustrates details of a method for protecting location privacy of cooperative spectrum sensing users, in accordance with some embodiments.

FIG. 3 illustrates details of a method 300 for protecting location privacy of cooperative spectrum sensing users, in accordance with some embodiments. At block 301, a secret key is established between each secondary user (SU) 101 and a fusion center (FC) 103. At block 302, a secret key is established between each SU 101 and a gateway (GW) 102. At block 303, a secret key is established between the GW 102 and the FC 103. At block 304, an Order Preserving Encrypted (OPE) Tau value is received from the FC 103. At block 305, OPE received signal strength (RSS) value is received from each SU 101. At block 306, each OPE RSS value with its corresponding OPE Tau value is compared, and a comparison result is generated at block 307. At block 308, the comparison result is sent to the FC 103. In some embodiments, the FC 103 is to make and send decisions to each SU 101. In some embodiments, each SU 101 of the plurality is to generate OPE RSS and send the OPE RSS to the receiver 106. In some embodiments, the FC 103 is positioned in a base station.

The following sub-section describes the underlying security primitives, on which the schemes of various embodiments rely, and then follows by precisely quantifying the information leakage of the schemes, which achieve the Security Objectives 1 and 2.

Fact 1: An OPE is indistinguishable under ordered chosen-plaintext attack (IND-OCPA) if it has no leakage, except the order of ciphertexts.

Let $\varepsilon$ and $OPE.\varepsilon$ be IND-CPA secure and IND-OCPA secure symmetric ciphers, respectively. $(\{RSS_i^j\}_{i=1,j=1}^{n,l}, \tau)$ are RSS values 107 and threshold 108 $\tau$ of each $U_i$ 101 and FC 103 for sensing periods j=1, ..., l in a group G. $(L_1, L_2, L_3)$ are history lists, which include all values learned by entities $U_i$ 101, FC 103 and GW 102, respectively, during the execution of the protocol for all sensing periods and membership status of G. Vector $\vec{V}$ is a list of IND-CPA secure values transmitted over secure (e.g., authenticated) channels. $\vec{V}$ may be publicly observed by all entities including external attacker A. Hence, $\vec{V}$ is a part of all lists ($L_1,L_2,L_3$). Values (jointly) generated by an entity such as cryptographic keys or variables stored only by the entity itself (e.g., $\lambda$, $\pi$) are not included in history lists for brevity.

TABLE 1

Computation overhead comparison

| Scheme | FC | SU | GW |
|---|---|---|---|
| LP-3PSS | $D + \beta \cdot (\epsilon + OPE_E)$ | $OPE_E + \epsilon$ | $n \cdot D + \epsilon$ |
| LPOS | $1/2 \cdot (2 + \log n) \cdot \gamma \cdot \|p\| \cdot Mulp$ | $(2y \cdot \|p\| + 2y) \cdot Mulp + OPE + 2\mu \cdot \log n \cdot PMulQ$ | — |
| PPSS | $H + (n + 2) \cdot Mulp + (2^{y-1} \cdot n + 2) \cdot Expp$ | $H + 2Expp + Mulp$ | — |
| PDAFT | $2ExpN^2 + InvN^2 + y \cdot MulN^2$ | $2ExpN^2 + MulN^2$ | $n \cdot MulN^2$ |

Variables:

$\kappa$ security parameter, N: modulus in Paillier, p: modulus of El Gamal, H: cryptographic hash operation, K: secret group key of OPE. Here, Expu and Mulu denote a modular exponentiation and a modular multiplication over modulus u respectively, where $u \in \{N, N^2, p\}$. $InvN^2$: modular inversion over $N^2$, PMul$Q$: point multiplication of order $Q$, Padd$yQ$: point addition of order $Q$. y: number of servers needed for decryption in PDAFT.

Parameters Size:

For a security parameter $\kappa=80$, suggested parameter sizes by NIST 2012 are given by: $|N|=1024$, $|p|=1024$, $|Q|=192$.

OPE:

Various embodiments rely on Boldyreva's OPE scheme for evaluation because of its popularity and public implementation. However, the embodiments are not limited to such, and the embodiments can use any secure OPE scheme as a building block.

$\epsilon$: Some embodiments use AES as ($\epsilon$, D) for the cost analysis. However, other encryptions schemes other than or in conjunction to AES may be used.

Theorem 1:

Under Security Assumptions 1 and 2, LP-3PSS of various embodiments leaks no information on $(\{RSS_i^j\}_{i=1,j=1}^{n,l},\tau)$ beyond IND-CPA secure $\{\vec{V}^j\}_{j=1}^{l}$, IND-OCPA secure pairwise order $\{OPE.\varepsilon_{k_{FC,j}}(RSS_i^j), OPE.\varepsilon_{k_{FC,j}}(\tau)\}_{i=1,j=1}^{n,l}$ to GW and $\{b_i^j\}_{i=1,j=1}^{n,l}$ to FC.

Proof:

$\vec{V}^j\{c_i^j, \varsigma_i^j, \xi_i^j\}_{i=1,j=1}^{n,l}$, where $\{c_i^j\}_{i=1,j=1}^{n,l}$ and $\{\varsigma_i^j, \xi_i^j\}_{i=1,j=1}^{n,l}$ are generated at the initialization and privacy sensing Algorithm 1, respectively. History lists are as follows for each sensing period $j=1, \ldots, l$:

$L_1 = \vec{V}^j, L_2 = (\{b_i^j\}_{i=1,j=1}^{n,l}, \vec{V}^j)$ $L_3 = (\{OPE.\varepsilon_{k_{FC,j}}(RSS_i^j), OPE.\varepsilon_{k_{FC,j}}(\tau)\}_{i=1,j=1}^{n,l},$
$\vec{V}^j, \{b_i^j\}_{i=1,j=1}^{n,l})$ Variables in ($L_1,L_2,L_3$) are IND-CPA secure and IND-OCPA secure, and therefore leak no information beyond the pairwise order of ciphertexts to GW by Fact 1. Any membership status update on G uses an authenticated channel establishment or removal for joining or leaving members, whose private keys are independent from each other. Hence, history lists ($L_1,L_2,L_3$) are computed identically as described above for the new membership status of G, which are IND-CPA secure and IND-OCPA secure.

Corollary 1:

Theorem 1 ensures that in the scheme of various embodiments, RSS values and $\tau$ are IND-OCPA secure for all sensing periods and membership changes. Hence, the scheme achieves Objectives 1 and 2.

The following section evaluates some embodiments of the scheme, LP-3PSS, by comparing it to existing approaches that are briefly explained below.

PPSS uses secret sharing and the Privacy Preserving Aggregation (PPA) process proposed to hide the content of specific sensing reports and uses dummy report injections to cope with the DLP attack.

LPOS also uses OPE but in a completely different way than how the various embodiments use it. Users OPE-encrypt their RSS values, send them to FC which, based on the order of the encrypted RSSs, performs at worst a logarithmic number of Yao's millionaires secure comparisons between $\tau$ and RSSs and then makes a final decision about spectrum availability, in accordance with some embodiments.

PDAFT combines Paillier cryptosystem with Shamir's secret sharing, where a set of smart meters sense the consumption of different households, encrypt their reports using Paillier, then send them to a gateway. The gateway multiplies these reports and forwards the result to the control center, which selects a number of servers (among all servers) to cooperate in order to decrypt the aggregated result. PDAFT uses a dedicated gateway, just like LP-3PSS, to collect the encrypted data, and a minimum number of working servers in the control center to decrypt the aggregated result.

The following section focuses on communication and computational overheads. This section considers the overhead incurred during the sensing operations but not that related to system initialization (e.g., key establishment), where most of the computation and communication is done offline. The membership change events in the network are modeled as a random process R that takes on 0 and 1, and whose average is $\mu$. R=0 means that no change occurred in the network and R=1 means that some users left/joined the sensing task.

Let $\beta(t)$ be a function that models the average number of users that join the sensing at the current sensing period t, where:

$$\beta(t) = \begin{cases} n(t) - n(t-1), & \text{if } n(t) - n(t-1) > 0 \ \& R(t) = 1 \\ 0, & \text{otherwise} \end{cases}$$

The execution times of the different primitives and protocols are measured on a laptop running Ubuntu 14.10 with 8 GB of RAM and a core M 1.3 GHz Intel processor, with cryptographic libraries MIRACL, Crypto++ and Louismullie's Ruby implementation of OPE.

Table 1 provides an analytical computational overhead comparison including the details of variables, parameters and the overhead of building blocks.

In LP-3PSS, FC uses merely a small constant number of (D, $\epsilon$, OPE) operations. An SU 101 uses one OPE and $\epsilon$ encryptions of its RSS. Finally, GW 102 uses one D operation per user and one $\epsilon$ of vector b. All computations in LP-3PSS rely on merely symmetric cryptography, which makes it the most computationally efficient scheme among all alternatives.

Figure 5:
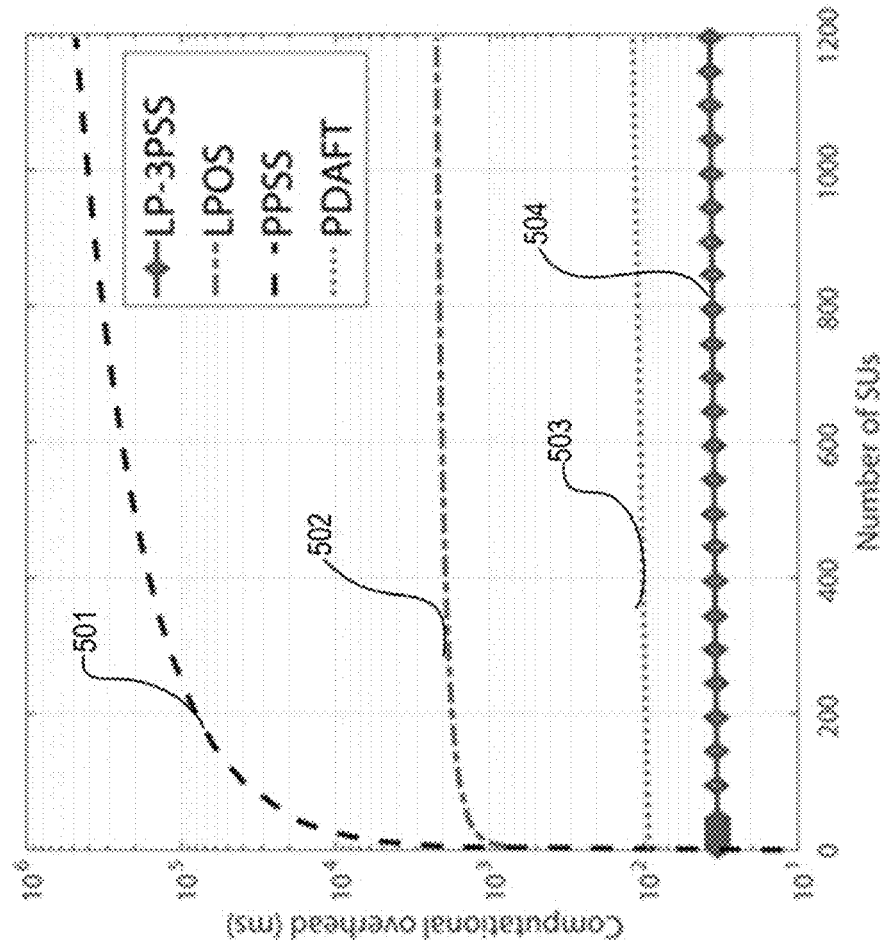
FIG. 5 illustrates a plot showing computational overhead of other schemes compared to the faster apparatus/method for protecting location privacy of cooperative spectrum sensing users in accordance with some embodiments.

FIG. 5 illustrates a plot 500 showing computational overhead of other schemes compared to the faster apparatus/method for protecting location privacy of cooperative spectrum sensing users in accordance with some embodiments. Here, the x-axis is number of SUs and the y-axis is Computational overhead (in milliseconds (mS)). For illustration, the system end-to-end computational overhead of the different schemes is plotted in plot 500. In this example, four waveforms are shown—501 for PPSS, 502 for LPOS, 503 for PDAFT, and 504 for LP-3PSS. Plot 500 shows that LP-3PSS 504 is several order of magnitudes faster than the other schemes including PPSS 501, LPOS 502, and LPOS 503 for any number of users.

Communication Overhead:

Table 2 provides the analytical communication overhead comparison. LP-3PSS requires (n+1) $\epsilon$ ciphertexts and single $\zeta$, which are significantly smaller than the ciphertexts transmitted in the other schemes.

TABLE 2

Communication overhead comparison

| Scheme | Communication |
|---|---|
| LP-3PSS | $(n + 1) \cdot \epsilon_\epsilon$ |
| LPOS | $2\gamma \cdot |p| \cdot (2 + \log n) + n \cdot \epsilon_{OPE} + \mu \cdot |Q| \cdot \log n$ |
| PPSS | $|p| \cdot n + \beta \cdot \mu \cdot |p| \cdot n$ |
| PDAFT | $|N| \cdot (2(n + 1) + \beta)$ | wherein, $\epsilon_{OPE}$ = 128 bits: maximum ciphertext size obtained under OPE encryption, $\epsilon_\epsilon$: size of ciphertext under $\epsilon$.

Figure 6:
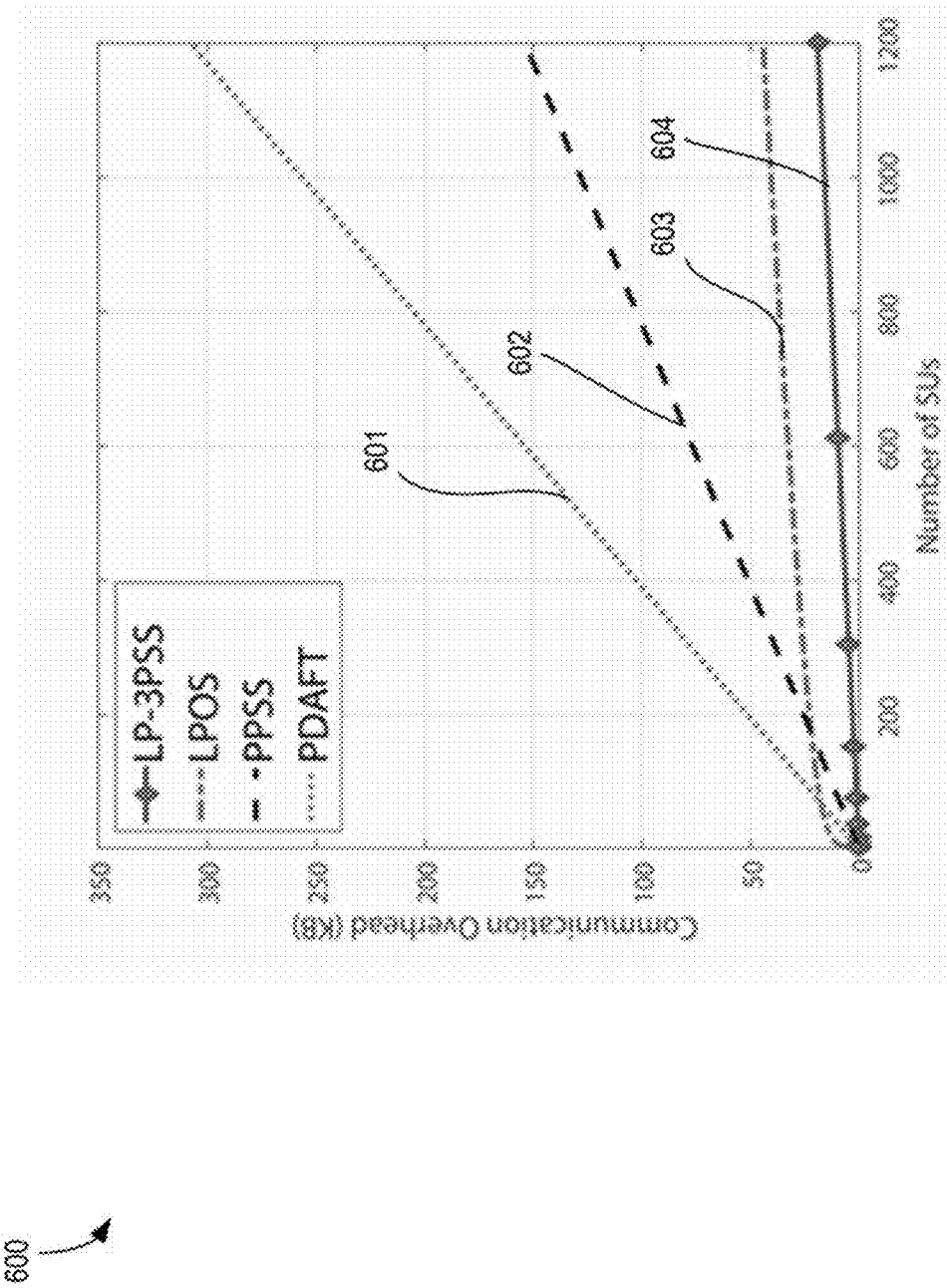
FIG. 6 illustrates a plot showing communication overhead of other schemes compared to the faster apparatus/method for protecting location privacy of cooperative spectrum sensing users in accordance with some embodiments.

FIG. 6 illustrates plot 600 showing communication overhead of other schemes compared to the faster apparatus/method for protecting location privacy of cooperative spectrum sensing users in accordance with some embodiments. Here, the x-axis is number of SUs and the y-axis is Computational overhead (in mS). In this example, four waveforms are shown—601 for PDAFT, 602 for PPSS, 603 for LPOS, and 604 for LP-3PSS. Plot 600 compares the scheme of various embodiments with its counterparts in terms of communication overhead. Plot 600 shows that LP-3PSS 604 has the smallest communication overhead compared to 601, 602, and 603 since, again, it relies on symmetric cryptography. PPSS 602 and PDAFT 601 may have a very high communication overhead due to the use of expensive public key encryptions.

Overall, the performance analysis of the various embodiments indicates that LP-3PSS is significantly more efficient than all other counterpart schemes in terms of computation and communication overhead, even for increased values of the security parameters, but with the cost of including an additional entity.

As such, the embodiments describe an efficient scheme for cooperative spectrum sensing that protects the location privacy of SUs with a low cryptographic overhead while guaranteeing an efficient spectrum sensing. The scheme of various embodiments is secure and robust against users dynamism, failures, and user maliciousness. The performance analysis of the various embodiments indicates that the scheme of various embodiments outperforms existing alternatives in various metrics.

Figure 7:
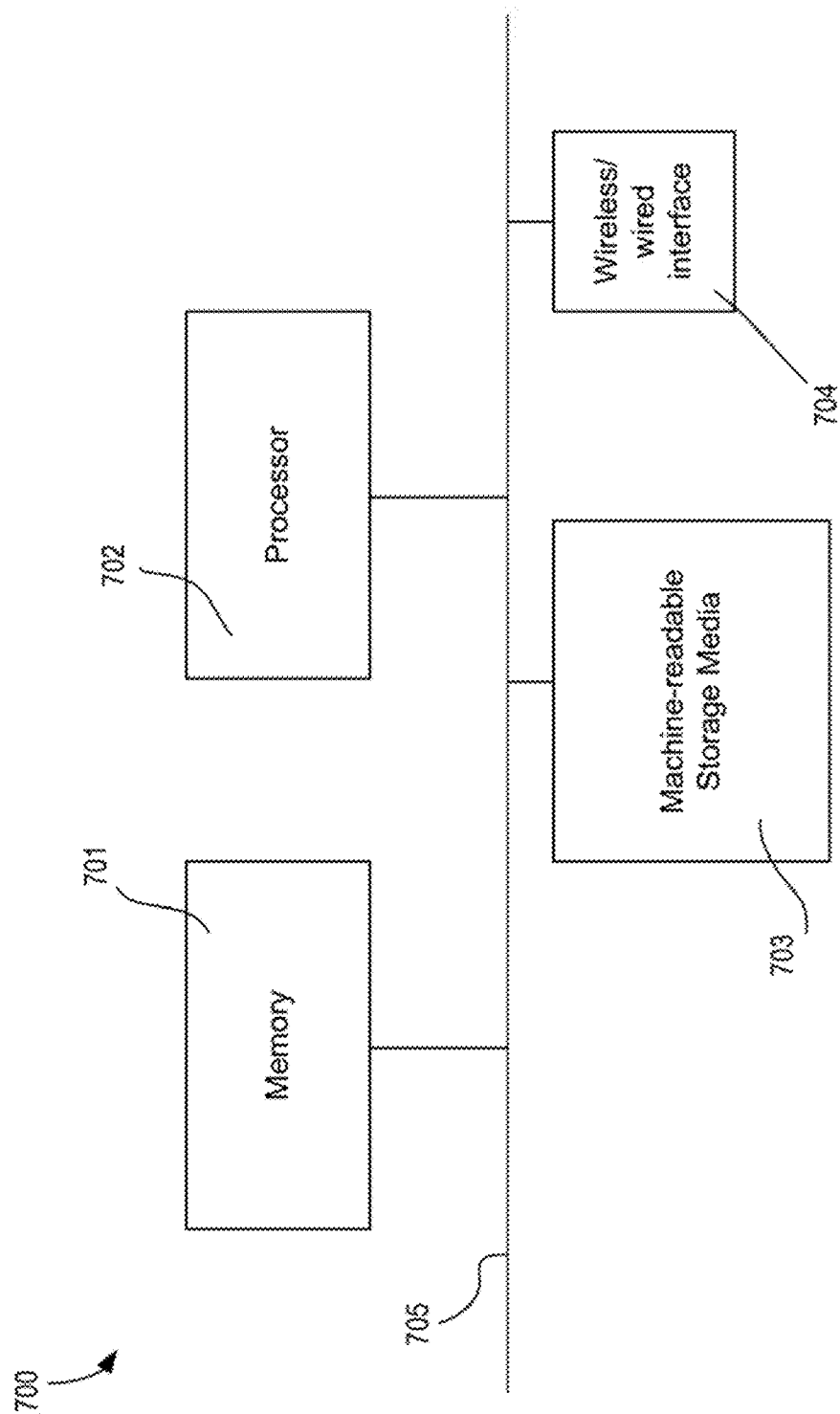
FIG. 7 illustrates a computing platform with machine-readable storage media having instructions stored thereon to perform a method for protecting location privacy of cooperative spectrum sensing users in accordance with some embodiments.

FIG. 7 illustrates a computing platform 700 with machine-readable storage media having instructions stored thereon to perform a method for protecting location privacy of cooperative spectrum sensing users in accordance with some embodiments.

Computing platform 700 is a simplified version of a computing device that includes memory 701, processor 702, machine-readable storage media 703, communication interface 704 (e.g., wireless or wired interface), and network bus 705 coupled together as shown.

Elements of embodiments (e.g., flowchart 300, 400, and scheme described with reference to FIGS. 1-2) are also provided as a machine-readable medium (e.g., memory) for storing the computer-executable instructions (e.g., instructions to implement any other processes discussed herein). The machine-readable medium (e.g., memory) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

The following examples are provided with reference to various embodiments.

Example 1. An apparatus comprising: logic to compare one or more received signal strength (RSS) values, from a plurality of secondary users (SUs), with a threshold value, wherein the threshold value is Order Preserving Encrypted (OPE) to generate an Order Preserving Encrypted (OPE) threshold value; a transmitter to send comparison result from the logic to a fusion center (FC); and a receiver to receive the OPE threshold value from the FC.

Example 2. The apparatus of example 1, wherein the RSS values are Order Preserving Encrypted to generate OPE RSS values.

Example 3. The apparatus of example 1 further comprising a gateway to compare OPE RSS values and the OPE threshold value.

Example 4. The apparatus of example 3, wherein the gateway is to generate a comparison outcome according to compared OPE RSS values and the OPE threshold value.

Example 5. The apparatus of example 4, wherein the gateway is to report the comparison outcome to the FC.

Example 6. The apparatus of example 5, wherein the FC is to make and send decisions to each SU of the plurality of SUs according to at least the comparison outcome.

Example 7. The apparatus of example 6, wherein the FC is to apply a voting based decision making rule.

Example 8. The apparatus of example 4, wherein the comparison result is a 1-bit result.

Example 9. The apparatus of example 1, wherein each SU of the plurality is to generate an OPE RSS value; and send the OPE RSS to the receiver.

Example 10. The apparatus of example 1, wherein the FC is positioned in a base station.

Example 11. A method comprising: setting energy sensing voting thresholds; establishing private pairwise keys; computing Order Preserving Encrypted (OPE) thresholds of the energy sensing voting thresholds; and processing the OPE thresholds and one or more received signal strength (RSS) values to generate an output.

Example 12. The method of example 11, wherein setting and establishing comprises: establishing a secret key between each secondary user (SU), of a plurality of SUs, and a fusion center (FC); establishing a secret key between each SU and a gateway (GW); and establishing a secret key between the GW and the FC.

Example 13. The method of example 12, wherein the OPE thresholds include an OPE Tau value, and wherein the method comprises: receiving the OPE Tau value from the FC; and receiving an OPE RSS value from each SU.

Example 14. The method of example 13, wherein processing comprises: comparing each OPE RSS value with its corresponding OPE Tau value, and generating a comparison result; and sending the comparison result to the FC.

Example 15. The method of example 12, wherein the FC is to make and send decisions to each SU.

Example 16. The method of example 15, wherein each SU of the plurality is to generate an OPE RSS value and a send the OPE RSS to a receiver.

Example 17. The method of claim 12, wherein the FC is positioned in a base station.

Example 18. A machine readable storage media having instructions stored thereon that when executed performs an operation which comprises: establish a secret key between each secondary user (SU), from a plurality of SUs, and a fusion center (FC); establish a secret key between each SU and a gateway (GW); establish a secret key between the GW and the FC; receive an Order Preserving Encrypted (OPE) Tau value from the FC; receive OPE Received Signal Strength (RSS) value from each SU; compare each OPE RSS value with its corresponding OPE Tau value, and generate a comparison result; and send the comparison result to the FC.

Example 19. The machine readable storage media of example 18, wherein the FC is to make and send decisions to each SU.

Example 20. The machine readable storage media of example 19, wherein each SU of the plurality is to generate an OPE RSS value and to send the OPE RSS value to a receiver, and wherein the FC is positioned in a base station.

Example 21. An apparatus comprising means for performing any of examples 11 to 17.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

We claim:

1. An apparatus comprising:
   logic to compare one or more received Order Preserving Encrypted (OPE) received signal strength (RSS) values, from a plurality of secondary users (SUs), with an OPE threshold value, wherein the OPE threshold is based on a deterministic symmetric encryption scheme whose encryption preserves a numerical ordering of plain texts;
   a transmitter to send a comparison result of the logic to a fusion center (FC); and
   a receiver to receive the OPE threshold value from the FC.

2. The apparatus of claim 1, wherein the FC is to make and send decisions to each SU of the plurality of SUs according to at least the comparison result.

3. The apparatus of claim 1, wherein the FC is to apply a voting based decision making rule to determine spectrum availability of a channel.

4. The apparatus of claim 1, wherein the receiver is a wireless receiver.

5. The apparatus of claim 1, wherein the comparison result is a 1-bit result.

6. The apparatus of claim 1, wherein each SU of the plurality is to:
   generate an OPE RSS value; and
   send the OPE RSS to the logic.

7. The apparatus of claim 1, wherein the FC is positioned in one of a base station, a server, a cloud, or a mobile device.

8. The apparatus of claim 1, wherein at least one of the SU is a mobile device.

9. The apparatus of claim 1, wherein:
   a first secret key is established between the FC and each SU of the plurality of SUs;
   a second secret key is established between each SU of the plurality of SUs and the apparatus; and
   a third secret key is established between the FC and the apparatus.

10. An apparatus comprising:
    a circuitry to compute Order Preserving Encrypted (OPE) thresholds of energy sensing voting thresholds, wherein the OPE thresholds and one or more received signal strength (RSS) values are processed to generate an output; and
    a receiver to receive the output to determine a spectrum availability of a channel.

11. The apparatus of claim 10, wherein the OPE thresholds include an OPE Tau value.

12. The apparatus of claim 11 comprising a transmitter to send the OPE Tau value to a gateway (GW).

13. The apparatus of claim 12, wherein the OPE thresholds and one or more RSS values are processed by the GW which is to compare each OPE RSS value with its corresponding OPE Tau value, and is to generate the output.

14. The apparatus of claim 12, wherein the transmitter is a first transmitter, and wherein the apparatus comprises a second transmitter coupled to a plurality of secondary users (SUs).

15. The apparatus of claim 14, wherein at least one of the SU comprises a mobile device.

16. The apparatus of claim 14, wherein each SU is to measure or detect spectrum sensing on a channel.

17. The apparatus of claim 14, wherein:
a first secret key is established between each SU and the GW;
a second secret key is established between the GW and the apparatus; and
a third secret key is established between each SU and the apparatus.

18. An apparatus comprising:
a comparator to compare one or more received Order Preserving Encrypted (OPE) signal strength (RSS) values, from a plurality of mobile devices, with an OPE threshold value;
a transmitter to send a comparison result of the comparator to a server or a base station; and
a receiver to receive the OPE threshold value from the server or the base station.

19. The apparatus of claim 18, wherein the server or the base station is to make and send decisions to each mobile device of the plurality of mobile devices according to at least the comparison result.

20. The apparatus of claim 19, wherein:
the server or the base station is to apply a voting based decision making rule to determine spectrum availability of a channel;
a first secret key is established between the server or the base station and each mobile device of the plurality of mobile devices;
a second secret key is established between each mobile device of the plurality of mobile devices and the apparatus; and
a third secret key is established between the base station or the server and the apparatus.

* * * * *